(12) United States Patent
Elberson

(10) Patent No.: US 6,223,645 B1
(45) Date of Patent: May 1, 2001

(54) COMPRESSED AIR FLOW RATE CONTROLLER FOR PAINT SPRAYER SYSTEM

(75) Inventor: Michael D. Elberson, Elm Grove, WI (US)

(73) Assignee: Autoquip, Inc., Milwaukee, WI (US)

( * ) Notice: Subject to any disclaimer, the term of this patent is extended or adjusted under 35 U.S.C. 154(b) by 0 days.

(21) Appl. No.: 09/322,425

(22) Filed: May 28, 1999

(51) Int. Cl.⁷ ..................................................... F15B 13/04
(52) U.S. Cl. ................. 91/31; 239/583; 239/61; 239/569
(58) Field of Search .................. 239/61, 62, 290, 239/300, 464, 412, 569, 570, 583, 586

(56) References Cited

U.S. PATENT DOCUMENTS

| | | | |
|---|---|---|---|
| 2,147,568 | * | 2/1939 | Barber ................................ 239/61 |
| 2,190,326 | * | 2/1940 | Benoit ................................ 239/61 |
| 2,558,681 | * | 6/1951 | Hachmeister ........................ 239/61 |
| 2,957,631 | * | 10/1960 | Armstrong ...................... 239/370 X |
| 3,275,240 | * | 9/1966 | Peaslee et al. ...................... 239/61 |
| 3,322,351 | * | 5/1967 | Hackel ........................... 239/570 X |
| 3,369,705 | * | 2/1968 | Curtis et al. .................... 239/61 X |
| 3,665,959 | | 5/1972 | Castillon . |
| 4,198,860 | | 4/1980 | King . |
| 4,284,032 | | 8/1981 | Moos et al. . |
| 4,474,680 | | 10/1984 | Kroll . |
| 4,632,309 | | 12/1986 | Reimer . |
| 4,792,092 | | 12/1988 | Elberson et al. . |
| 4,928,880 | | 5/1990 | Prus et al. . |
| 5,318,225 | | 6/1994 | Condron . |
| 5,325,884 | | 7/1994 | Mirel et al. . |
| 5,480,349 | | 1/1996 | Kolta . |
| 5,553,493 | | 9/1996 | Box et al. . |
| 5,586,045 | | 12/1996 | Box et al. . |
| 5,676,310 | | 10/1997 | Hynds . |

OTHER PUBLICATIONS

"Weight of Spray Gun" [subheading in excerpt from untitled article], by Ron Joseph, *Metal Finishing*, Jan. 1998, pp. 65, 66, and [unnumbered third page].

"How to Get the Most from HVLP Guns by Understanding Air Pressure and Volume, ", by Ron Joseph, *Metal Finishing*, Aug. 1998, pp. 20, 22, and 24.

* cited by examiner

*Primary Examiner*—John E. Ryznic
(74) *Attorney, Agent, or Firm*—Boyle, Fredrickson, Newholm, Stein & Gratz; James F. Boyle

(57) ABSTRACT

A controller for controlling the flow rate of compressed air to a spray paint gun as well as to a comparable tool which is optimally operative dependant upon receiving a specified flow rate of air includes a flow control valve which regulates the air flow rate therethrough based on a pressure differential signal received from an air flow meter. The pressure differential signal transmitted to the air flow controller is balanced against an opposing spring biased needle in the flow controller.

15 Claims, 2 Drawing Sheets

COMPRESSED AIR FLOW RATE CONTROLLER FOR PAINT SPRAYER SYSTEM

BACKGROUND OF THE INVENTION

1. Field of the Invention

The present invention relates to an apparatus and method for controlling the flow of compressed air, and in particular for controlling the flow rate of compressed air to a paint spray system and to other tools which are optimally operative dependent upon receiving a specified flow rate of air.

2. Background of the Invention

Many factories use compressed air as a source of power for operating various types of production equipment. "Compressed air," which is sometimes referred to as "pressurized air" or referred in spray paint operations as "atomization air," is defined as free air that has been pressed into a volume that is smaller than it normally occupies. Controlled expansion of the compressed air can be used as a source of power to operate a wide range of pneumatically powered tools.

Compressed air is typically supplied from onsite or nearby compressors and piped through a distribution system to a downstream point of use. Paint spraying operations for painting various types of manufactured products, including especially automobiles and airplanes, is one typical use of compressed air.

In a spray paint operation, a paint fluid, which can be in the form of either a liquid or a fine powder, is mixed together with compressed air in a spray gun nozzle in order to atomize the paint into extremely fine particles and to transfer the paint particles onto the surface of the item being painted. One commonly used spray paint gun, referred to in the industry as a high volume low pressure (HVLP) spray gun, generates high volumes of low pressure air which transfers the paint particles to the surface of the article being painted with a relatively low velocity. Other uses of compressed air include pneumatically powered machine tools, drills and wrenches, and other pneumatically powered items which are optimally operative dependent upon receiving a specified flow rate of the pressurized air into the tool.

Major changes in downstream air demand create varying loads on the compressors. Air compressors are typically controlled according to system supply pressure, coming online as the system air pressure at the compressor drops below a threshold pressure and going offline at a higher cutout pressure. This is a rather crude method of controlling air supply, especially as air compressors are normally quite slow to respond to change.

Industrial compressed air systems are commonly controlled by pressure regulation, meaning, by regulating the nominal air pressure at a certain point in the system. A pressure regulator might be placed, for example, at or near the compressor, at one or more points on the distribution line, or on a hose which used to supply air to the tool. The major disadvantage with this method is that measuring air pressure at only one particular point in the system is not necessarily a good indicator of the air pressure at another point in the system. Air pressure drops as it flows through the system, and the amount that the air pressure drops from one point to the next varies greatly depending on the specific installation and also on varying conditions of usage during the course of the day. In many cases a compressed air system supplies not only spray guns but also other devices used in a paint shop such as sanders, polishers, screw drivers, drills and so forth. The intermittent operation of such other tools will affect the air pressure throughout the system.

For paint spray operations in particular, one commonly used method for determining whether a sufficient amount of compressed air is being delivered to the spray gun is to place a pressure gage on the cap of the spray gun immediately after the painter has set the spray gun for proper atomization of the paint but before he actually begins painting. Many operators, however, find this extra step to be a great inconvenience which interrupts their painting operations, and so they often do not do it. Another method to checking whether a sufficient amount of compressed air is being delivered to the spray gun is to attach an air pressure regulator and gage to the handle of the gun. However, attaching a pressure regulator to the gun naturally increases its weight. Over a period of time, muscle fatigue sets in, thereby causing the operator to use unnatural arm and wrist actions, which cause overspray or underspray conditions and other flaws in the paint job.

More importantly, regulating the nominal pressure at any one point in the system does not necessarily mean that the proper amount of air, or even any air is flowing at another point downstream. There may be a blockage in the spray nozzle of a paint gun, or a break in the line or some other problem in the system.

The difficulty in delivering a proper amount of compressed air to a spray paint nozzle is further exasperated by the fact that paint viscosity varies due to temperature fluctuations. If the temperature of the paint varies, the amount of paint fluid delivered to the nozzle of the spray gun also varies. Therefore, to compensate for the change in viscosity of the paint fluid, the amount of compressed air delivered to the spray gun nozzle must be adjusted. This type of adjustment is not easily done with only pressure regulation, and at a minimum requires a great deal of testing and trial and error to achieve the proper settings. Additionally, in many typical spray paint operations a single compressor is used to deliver compressed air to a number of output points. Each point is located a different distance from the air compressor, and so the pressure drops from the compressor to one point or the other will differ. Further, hoses which deliver air from the output point on the wall to the spray gun in the paint booth often differ in length, diameter or both, which greatly affects the pressure drop from one end of the hose to the other. Additionally, different types of spray paint guns, which require different amount of pressurized air, may be employed. The number of variables which are encountered during the course of operations thus increase to the point where it is nearly impossible to control the amount of compressed air delivered to the spray paint gun based merely on regulating the nominal air pressure at any particular point in the system.

Accordingly, an improved means for controlling the flow rate of compressed air delivered to a spray paint gun, as well as to other types of pneumatic tools which are optimally operative dependent upon receiving a specified flow rate of compressed air is desired.

SUMMARY OF THE INVENTION

A method and apparatus for monitoring and compensating the flow rate of compressed air delivered to a paint spray gun and other comparable pneumatic tools comprising both air flow rate and pressure based control of the compressed air system is disclosed. The invention includes an apparatus and method for measuring the air flow rate between two points in the system, comparing the measured flow rate to a desired flow rate, and then adjusting the flow rate in response to a difference between the measured flow rate and the desired flow rate, if any, and for also regulating the ultimate pressure in the system.

Generally, the present invention of an apparatus and method for controlling the air flow rate to a spray paint gun comprises: providing a source of compressed air; providing a source of paint fluid; mixing the paint fluid with the compressed air to thereby atomize the paint fluid and thereby transfer the atomized paint fluid to a substrate; measuring the flow rate of the compressed air by measuring a pressure differential across a fixed orifice located at a point downstream from the source of compressed air but upstream from where the compressed air is mixed with paint fluid; comparing the measured pressure differential to a desired pressure differential; and, in response to a difference between the measured pressure differential and the desired pressure differential, if any, adjusting the flow rate so that the measured pressure differential will equal the desired pressure differential. The above-described apparatus and method for controlling air flow rate is also preferably used in combination with a pressure regulating circuit that controls the ultimate pressure in the compressed air system particularly when the air flow rate drops to zero.

In the present invention, a pressure differential signal is generated by directing the compressed air through a fixed orifice obstruction, and by measuring the relative pressure difference between two points on either side of the orifice. The pressure differential signal is transmitted to a control device which compares the measured pressure signal to a desired pressure differential signal, and if there is a difference makes an automatic correction to adjust the flow rate to a desired amount. When the pressure differential signal is zero, which means that the air flow rate is also zero because the tool has been deactivated, the system automatically reverts to pressure regulation circuit. Thus, by controlling the rate of air delivered to the spray gun or other tool, as opposed to merely controlling the nominal air pressure at a single point in the system, the operator is assured that the proper amount of compressed air will be delivered to the tool. Additionally, when the tool is deactivated, the pressure regulation circuit assures that an overpressurization of the system will not occur.

The present invention of an air flow rate control method and apparatus provides a number of significant advantages over mere pressure regulation methods in the prior art. Such advantages include providing consistent air flow to the pneumatic tool regardless of supply hose diameter or length. The monitoring of flow rate can be used to detect various problems in the system such as pinched hoses, malfunctions of the tools, and other unexpected abnormalities in the demand or supply of the pressurized air.

Installations such as body shops normally include several air outlets so that the painter can disconnect the spray gun and move to various locations within the spray booth. Such installations now require several pressure regulators to be installed inside the spray booth. By using the air flow control of the present invention, a single supply pipe can be installed circling the spray booth area and the proper amount of compressed air will be delivered to the tool regardless of the location of the operator.

Other objects and advantages of the invention will become apparent from the following description which, taken in connection with the accompanying drawings, set forth by illustration and example certain embodiments of the present invention.

BRIEF DESCRIPTION OF THE DRAWINGS

The drawings, which constitute part of the specification and include exemplary embodiments of the present invention, include the following.

DETAILED DESCRIPTION OF THE PREFERRED EMBODIMENT

Figure 1:
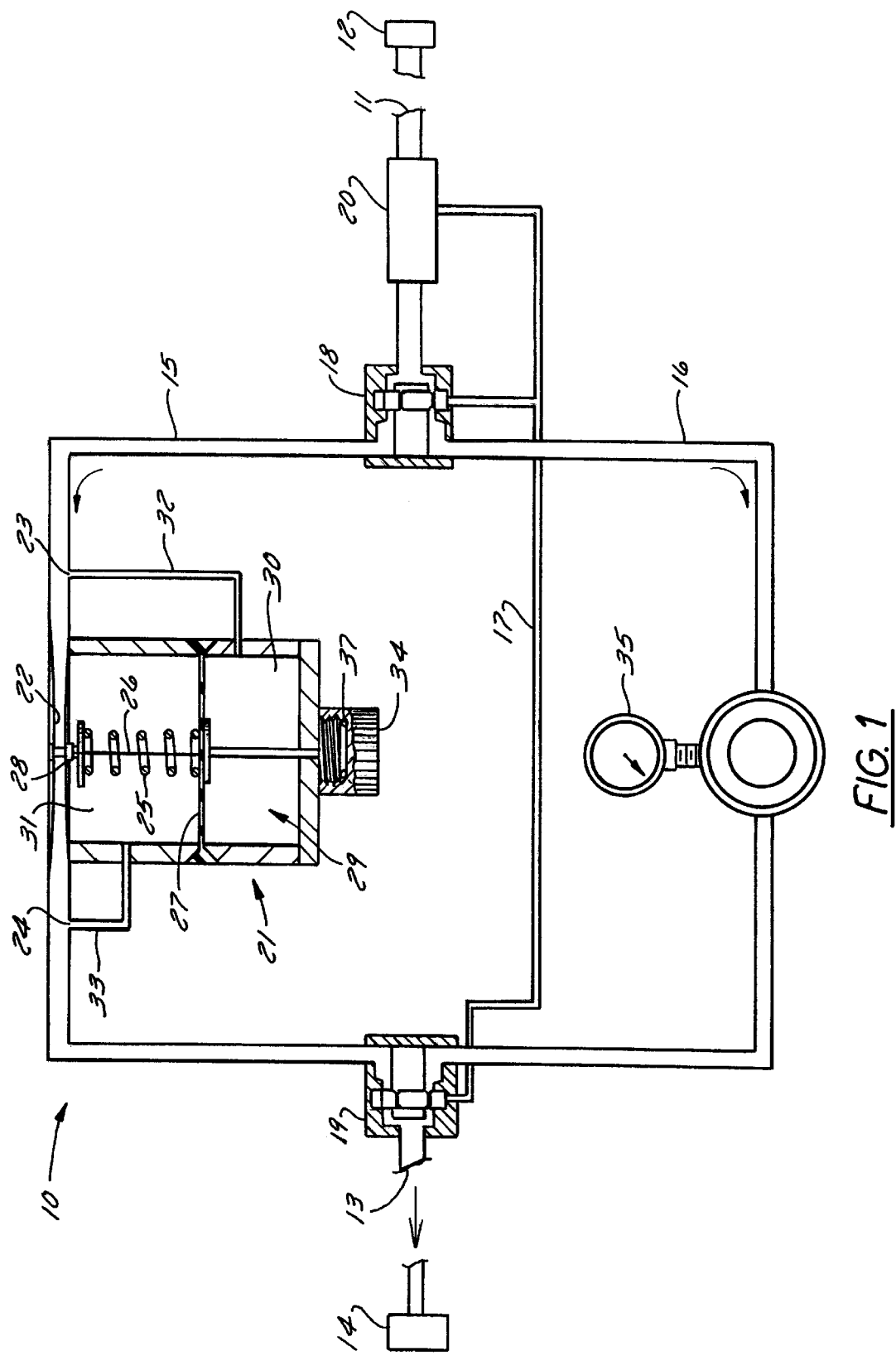
FIG. 1 is a pneumatic illustration of a first embodiment of a device for controlling the flow rate of compressed air delivered from an air source to a point of use in accordance with the principles of the present invention.
Figure 2:
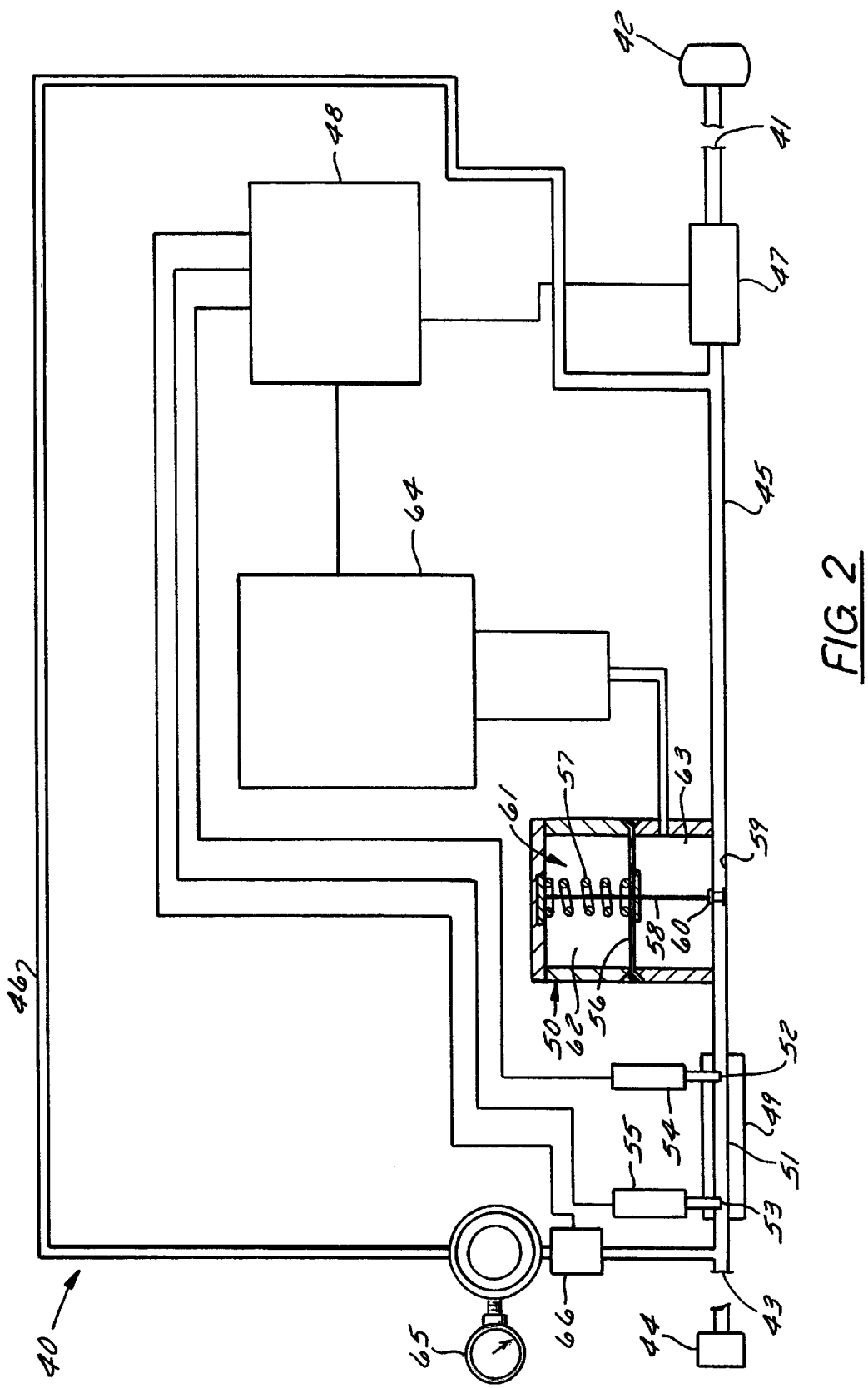
FIG. 2 is a pneumatic and electrical illustration of a second embodiment of a device for controlling the flow rate of compressed air in accordance with the principles of the present invention.

Referring to FIGS. 1 and 2, the invention disclosed herein relates to a method and apparatus for controlling the air flow rate of compressed air, sometimes referred to as either pressurized air or as atomization air, to a tool. The method and apparatus are particularly useful for use in connection with a spray paint operation, in which the compressed air is mixed with a volume of liquid or powdered paint in order to atomize the paint fluid into minute particles and transfer the paint particles onto the surface of an item being painted. The invention disclosed herein is also adaptable for use with other types of pneumatically powered tools in which the optimal operation of the tool is dependent upon receiving a predetermined or desired flow rate of compressed air, such as, for example, air powered tools that require constant rpm or torque. FIG. 1 illustrates a first embodiment of the present invention, which essentially comprises a mechanical flow rate control apparatus. FIG. 2 illustrates a second embodiment of the invention, which essentially comprises an electromechanical flow rate control apparatus. Both embodiments are based on the principle that the flow rate of a fluid through a passageway of known dimension can be calculated by determining pressure differential between two points in the passage, and by comparing the measured pressure differential to a desired pressure differential, the actual flow rate can then be adjusted to reach and maintain a desired flow rate. Both embodiments also provide a dual means for controlling the compressed air systems, that is, by monitoring and adjusting the air flow rate when the tool is activated and air is flowing through the system and also by monitoring and regulating the overall pressure in the system especially when the tool has been deactivated and there is no air flow through the system.

Referring to FIG. 1, a mechanical compressed air flow rate control apparatus 10 in accordance with the present invention includes an air inlet 11 for receiving compressed air from an air pressurizing source 12, such as a compressor, and an air outlet 13 for transmitting the compressed air to a tool 14, such as a paint spray gun. Between the air inlet 11 and air outlet 13 is a first air flow path 15, a second air flow path 16, and a pilot air flow path 17. Two air flow diverter valves, namely, a first air diverter valve 18 and a second air diverter valve 19, direct the flow of air from the inlet to the outlet through either the first air flow path 15 or second air flow path 16. The diverter valves are each essentially a three-way valve which select the direction of air flow. Specifically, the first air diverter valve 18 is connected adjacent to the air inlet 11, and the first air diverter valve 18 directs the flow of air from the air inlet to either the first air flow path 15 or the second air flow path 16. Similarly, the second air diverter valve 19 is connected at or near the air outlet 13, and the second diverter valve receives pressurized air from either the first air flow path 15 or second air flow path 16, and directs it to the air outlet 13 and thus to the tool 14. An air flow switch 20 located upstream from the first diverter valve 18 is used to actuate the pilot air flow path 17, which in turn actuates the first and second air diverter valves (discussed further below).

The first air flow path 18 is essentially a pipe or tube structure which provides a pneumatic passageway for the air to flow from the first diverter valve 18 to the second diverter valve 19. The first air flow path includes an air flow controller 21 located between the first and second diverter valves. The air flow controller 21 includes a fixed orifice obstruction 22 for producing a pressure differential between a first point 23 and a second point 24 in the first air flow path 15. The internal geometry of the obstruction in the orifice creates a resistance to the air flowing through the first air flow path. The resistance produces a pressure drop between the first point 23 and second point 24 in the flow path. Of course, the volume of air flowing through a passage of fixed dimension is dependent upon the pressure differential between two longitudinally spaced apart points in the air flow passageway. If the difference in pressure between the two points is zero, then obviously the flow rate is also zero. As the difference in pressure between the two points increases, the flow rate of the air likewise increases. Thus, the pressure difference of air flowing through the orifice can be used to both monitor and control the flow rate.

The air flow controller 21 further includes a spring 25 which biases a needle 26, and a diaphragm 27 for controlling the position of the needle. The needle 26 is positioned laterally to the path of air flowing through the fixed orifice obstruction 22. Further, the needle 26 protrudes through an opening 28 in the center of the fixed orifice obstruction 22, and the needle is slidable into and out of the fixed orifice. As a result, the position of the needle controls the amount of air flowing through the fix orifice obstruction. The needle 26 is normally biased by the spring 25 in the open position, meaning that the needle is fully retracted out of the opening 28 so that the air flow passageway in the orifice is completely clear. As the needle 26 gradually protrudes through the opening and into the orifice the flow of air through the orifice becomes partially or fully blocked, which consequently reduces the amount of air flowing through the device.

The needle 26, spring 25 and diaphragm 27 are contained within an air chamber 29 inside the air flow controller 21, with the diaphragm 27 essentially dividing the air chamber 29 into a first subchamber 30 and a second subchamber 31, the first subchamber 30 of course being on one side of the diaphragm 27 and the second subchamber 31 being on the other side of the diaphragm 27. As mentioned, the fixed orifice obstruction 22 produces a pressure differential between a first point 23 and a second point 24 in the first air flow path. A first air portal tube 32 pneumatically connects the first point 23 to the first subchamber 30. A second air portal tube 33 pneumatically connects the second point 24 in the fixed orifice obstruction to the second subchamber 31.

When the pressure differential between the first point and second point is zero, the spring 25 biases the needle 26 so that the fixed orifice is in the fully open position. As the air flow rate through the fixed orifice increases, a pressure differential will be created between the first point 23 and the second point 24.

The nominal pressure valve at the first point 23 in the flow path is transmitted through the first air portal tube 32 into the first subchamber 30 of the air flow controller 21, and the nominal pressure valve at the second point 24 in the flow path is transmitted through the second air portal tube 33 to the second subchamber 31 in the air flow controller, so that substantially the same pressure differential that exists between the first and second points in the air flow path is reproduced between the first and second subchambers in the air flow controller. As a result, as the pressure differential between the first and second points in the air flow path becomes increased, the pressure in the first subchamber 30 of the flow controller 21 likewise becomes increased relative to the air pressure in the second subchamber 31, thereby causing the diaphragm 27 to deflect and depress the needle 26 into the opening 28 in the fixed orifice and thereby balance the air flow. The desired flow rate of the compressed air is achieved when the pressure differential between the first subchamber 30 and second subchamber 31 in the flow controller 2 is balanced against the spring force of the needle 26.

The air flow rate can be manually adjusted by rotating a manual adjusting knob 34 on the flow controller 21, which contains a counteracting spring 37. The force of the counteracting spring 37 acts in the opposite direction of the force produced by spring 25. Thus, by tightening the knob 34, the counteracting spring 37 urges the needle 26 toward the opening 28 in the orifice which in effect reduces the air flow rate. Conversely, by untightening the knob 34 the spring force of the counteracting spring 37 is reduced which in turn allows the needle to retract from the opening 28 in the orifice and thereby effectively increase the flow rate.

As mentioned, the second air flow path 16 is essentially comprised of a pneumatic conduit which extends from the first diverter valve 18 to the second diverter valve 19. The second air flow path includes a pressure gauge 35 with a pressure relief valve located between the two diverter valves.

The air flow controller illustrated in FIG. 1 operates in substantially the following manner.

When the spray gun or other tool 14 is not triggered, the air flow switch 20 located in the supply airline would not be activated and the pilot air path 17 from the air flow switch would not be pressurized. Upon triggering the tool, the air flow switch 20 pressurizes the pilot air path 17 thereby causing the first and second three-way diverter valves 18 and 19 to switch so that the flow of air is directed through the first air flow path 15. With the diverter valves activated the flow control valve 21 modulates the flow rate based on pressure differential between the first and second points 23 and 24 in the fixed orifice.

The spring pressure on the needle 26 adjusts the flow rate through the flow control valve. With no flow, the flow control valve 21 would be wide open. As flow increases, the valve gradually closes based on the pressure drop between the first and second air portal tubes 32 and 33 in the flow controller 21. The resultant flow rate is based on balancing the pressure differential force of the diaphragm 27 which is produced by the pressure drop across the valve and the force of the spring 25 urging the needle 26 valve open.

When the spray gun or tool 14 is triggered off, the air flow of course stops. When the flow through the air flow switch 20 drops to zero, the pilot signal in the pilot air path 17 is exhausted out through the air flow switch 20. As a result, the first and second air diverter valves 18 and 19, which are spring biased, automatically switch back to divert the compressed air through the second air path 16 which provides for a pressure control. Since the regulator 35 on the pressure loop 16 is self-relieving, any over pressurization of the system will be relieved.

An electromechanical flow control apparatus 40 which produces substantially the same results is shown in FIG. 2. Referring to FIG. 2, the electromechanical air flow controller 40 likewise includes an air supply inlet 41 for receiving compressed air from an air pressurizing source 42, and an air outlet 43 for transmitting the compressed air to the tool 44.

Between the air inlet and air outlet are a first air flow path 45 and a second air flow path 46. Also, at or near the air inlet is an air flow switch 47. The air flow switch is electrically connected to an electronic microprocessor 48 which controls the opening and closing of a downstream solenoid valve 66 (discussed further below).

On the electromechanical air flow controller shown in FIG. 2, the first air flow path 45 includes a pressure differential air flow control meter 49 and a flow control valve 50. The pressure differential air flow control meter 49 similarly includes a fixed orifice obstruction 51 for producing a pressure differential between a first point 52 and a second point 53 in the first air flow path. At the first point 52 is a first pressure transducer 55 for measuring the nominal air pressure and for generating an electronic signal in response to the measured nominal air pressure at that first point 52. At the second point 53 on the flow meter 49 is a second pressure transducer 55 for measuring the nominal air pressure and for generating a second electronic pressure signal responsive to the measured nominal air pressure at that second point 53. As air flows through the flow meter 49, the fixed orifice obstruction produces a difference in pressure between the first and second points 52 and 53, which consequently produces an electronic pressure differential signal generated by the first and second pressure transducers 54 and 55. The first and second pressure transducers 54 and 55 are each electrically connected to the microprocessor 48.

The flow control valve 50 is located upstream from the differential pressure flow meter 49. The flow control valve 50 for the electromechanical flow controller likewise includes a diaphragm 56, spring 57 and needle 58 combination for controlling the air flow through the first air flow path 45. Specifically, the flow control valve 50 comprises a needle 58 which extends laterally to a passageway 59 in the first air flow path 45, the needle 58 being slidable through a lateral opening 60 in the passageway 59. The needle 58 is normally in the fully retracted position, meaning that the passageway 59 is normally open. The air flow rate through the passageway 59 is controlled by sliding the needle 58 through the lateral opening 60 to partially or in some cases completely block the air flow through the passageway 59. The flow control valve 50 further comprises an air chamber 61 subdivided by the diaphragm 56 into a first subchamber 62 and a second subchamber 63. The position of the needle 58 is controlled by deflection of the diaphragm 56. One of the subchambers 63 in the flow control valve 50 is pneumatically connected to a voltage to pneumatic converter 64. The voltage to pneumatic converter 64 is also electrically connected to the microprocessor 48. The flow control valve 50 is thus arranged to control the amount of compressed air flowing through the first air path 45 in response to the electronic signals produced by the first and second pressure transducers 54 and 55.

The second air flow path 46 further includes a pressure regulator 65 and a solenoid valve 66 for opening and closing the second air flow path. The electronic microprocessor 48 therefore receives electronic signals from the air flow switch 47 and receives further signals from the first and second pressure transducers 54 and 55 in the differential pressure flow meter 49, and depending on the signals received, controls the opening and closing of the solenoid valve 66 in the second air flow path 46, and controls the voltage to pneumatic converter 64 which in turn produces a pneumatic signal to control the position of the needle 58 in the flow control valve 50 in the first air flow path 45.

The electromechanical air flow controller 40 shown in FIG. 2 operates substantially as follows. When the tool 44 has not yet been triggered, the system is pressurized, but in a static ready condition. The solenoid valve 66 is open, and system pressure is regulated by pressure regulator 65. Upon triggering the tool 44, the air flow switch 47 at the air inlet 41 is activated, meaning that the flow of air through the air flow switch 47 produces an electronic signal to that effect which is transmitted to the microprocessor 48, which in turn transmits a further electronic signal to close the solenoid valve 66. Thus, air now flows from the air inlet 41 to the air outlet 43 only through the first air path 45. As air flows through the pressure differential flow meter 49, a pressure differential between the first and second points 52 and 53 causes the first and second pressure transducers 54 and 55 to generate an electronic pressure differential signal which is sent to the microprocessor. The electronic pressure differential signal is compared to a desired signal, and depending upon the difference in value between the measured signal and the desired signal the microprocessor directs the voltage to pneumatic converter to produce and transmit a pneumatic signal which is sent to the air flow control 50. The pneumatic signal sent to the air flow controller 50 causes a deflection in the diaphragm 56 to either open the flow control valve to permit a greater flow of pressurized air through the system, or close the air control valve in order to restrict the amount of air flowing through the system.

When the tool 44 is triggered off, air flow through the pressure differential flow meter 49 stops. When there is no air flow through the pressure differential flow meter 49, the electronic signal produced by the first and second pressure transducers 54 and 55 is equal, which causes the flow control processor 48 to open the solenoid valve 66 in the second air flow path 46, and thereby revert the system back to pressure regulation status.

It is to be understood that the embodiments disclosed above are merely exemplary of the invention which may be embodied in various forms. Changes maybe made in the details of construction, arrangement and operation of various elements of the invention without departing from the spirit of the invention. For example, the function pressure differential flow meter 49 which includes two pressure transducers 54 and 55 as described above could be performed by a turbine flow meter or alternatively by a heat flow meter. As a further example, the flow rate control feature of particularly the electromechanical embodiment of the invention shown in FIG. 2 might be activated by an electronic signal received from the tool rather than just a pneumatic signal. Therefore, specific structural and functional details disclosed above are not to be interpreted as limiting the scope of the invention, but are presented merely as the basis for the claims and for teaching one skilled in the art to various employ the present invention in any appropriately detailed manner especially as defined in the following claims.

What is claimed is:

1. An apparatus for controlling the flow rate of compressed air to a paint spray gun, said paint spray gun being optimally operative dependent upon receiving a specified flow rate of said compressed air, said apparatus comprising:

an air inlet for receiving compressed air from an air pressurizing source;

an air outlet for transmitting the compressed air to the paint spray gun;

a first air flow path between the inlet and the outlet;

a second air flow path between the inlet and the outlet;

a first air diverter valve pneumatically connected to the air inlet, first air flow path and second air flow path, said first air diverter valve directing the flow of compressed air from the air inlet to either the first air flow path or the second air flow path;

a second air diverter valve connected to the air outlet, first air flow path and second air flow path, said second air diverter valve directing the flow of compressed air from either the first air flow path or the second air flow path to the air outlet;

said first air flow path including an air flow controller, said air flow controller comprising:
 a fixed orifice obstruction for producing a pressure differential of air flowing between a first point and a second point in said first air flow path;
 a spring biased needle, said needle being slidable through a lateral opening in said fixed orifice obstruction for controlling the flow rate of air therethrough;
 a diaphragm for controlling the position of the needle;
 a first air portal tube pneumatically connecting said first point to one side of said diaphragm and a second air portal tube pneumatically connecting said second point to the other side of said diaphragm so that a pressure differential between said first and second points results in producing substantially the same pressure differential between said one side and said other side of said diaphragm, thereby causing said diaphragm to deflect which in turn causes said needle to move into or out of said obstruction; and
 said second air flow path including a pressure regulator for regulating the pressure of air in the second air flow path.

2. The apparatus of claim 1 further comprising an air flow switch upstream from the first diverter valve, and a pilot air flow path pneumatically connecting the air flow switch to the first diverter valve and to the second diverter valve;
 wherein upon receipt of a pneumatic signal indicating activation of said paint spray gun, the air flow switch pressurizes the pilot air path and the pressurized pilot air flow path actuates the first and second diverter valves to direct the flow of said compressed air through the first air flow path; and
 wherein upon receipt of a pneumatic signal indicating deactivation of said tool, the air flow switch vents and thus depressurizes the pilot air flow path thereby actuating the first and second diverter valves to direct the compressed air through the second air flow path.

3. The apparatus according to claim 1, wherein the air flow controller comprises an air chamber, the diaphragm dividing the air chamber into a first subchamber and a second subchamber, the first air portal tube pneumatically connecting the first point in the fixed orifice obstruction to the first subchamber, and the second air portal tube pneumatically connecting the second point in the fixed orifice obstruction to the second subchamber.

4. The apparatus according to claim 3, wherein the spring biased needle in the air flow controller is normally biased in the fully open position, and wherein deflection of the diaphragm is proportional to the pressure differential between the first and second points in the fixed orifice obstruction.

5. The apparatus according to claim 4, the air flow controller further comprising a manual adjustment knob including a counteracting spring, said counteracting spring being biased in direction urging the needle toward a closed position.

6. A method for controlling the flow rate of compressed air delivered to a spray paint gun, said spray paint gun adapted for receiving and mixing said compressed air with a paint fluid to thereby atomize said paint fluid and to thereby transfer said paint fluid from said spray paint gun to a substrate, the method comprising:
 receiving compressed air from an air pressurizing source;
 directing the compressed air through a flow path including fixed orifice obstruction thereby producing a pressure differential between a first point and a second point in said flow path;
 reproducing substantially the same pressure differential within an air flow control chamber located adjacent to said fixed orifice obstruction; and
 in response to said pressure differential, sliding a needle into said fixed orifice obstruction to thereby partially restrict the flow rate of the compressed air through the flow path.

7. The method of claim 6 further comprising:
 biasing said needle so that the fixed orifice obstruction is normally fully open, and sliding said needle to restrict the flow rate by deflecting a diaphragm, said diaphragm being connected to said needle, said diaphragm and needle being contained within said air flow control chamber.

8. The method of claim 7, wherein said diaphragm essentially divides said air flow control chamber into a first subchamber and a second subchamber, and the method further comprises producing a pressure differential between the first subchamber and second subchamber to thereby deflect the diaphragm.

9. The method of claim 8, further comprising:
 biasing said needle with a spring force; and
 balance the pressure differential between the first and second subchambers with the spring force.

10. The method of claim 9, further comprising adjusting a counteracting spring biased in a direction opposite said spring force.

11. An apparatus for controlling the flow rate of compressed air to a paint spray gun, said paint spray gun being optimally operative dependant upon receiving a specified flow rate of said compressed air, said apparatus comprising:
 an air inlet for receiving compressed air from an air pressurizing source;
 an air outlet for transmitting the compressed air to the tool;
 a first air flow path between the air inlet and the air outlet;
 a second air flow path between the air inlet and the air outlet;
 said first air flow path further comprising:
  an air flow control meter, said air flow control meter producing an electronic signal corresponding to the flow rate of said compressed air through said air flow control meter; and,
  a flow control valve for controlling the flow rate of air through the first air flow path in response to the electronic signal received from said flow control meter;
 said second air flow path further comprising:
  a pressure regulator; and
  a solenoid valve, for opening ad closing the second air flow path, said solenoid valve being downstream from said pressure regulator; and
 an electronic microprocessor electronically connected to said air flow control meter and to said solenoid valve, said microprocessor activating said solenoid valve in response to a demand signal received from the tool, and adjusting said flow control valve in response to the electronic signal received from the flow control meter.

12. The apparatus of claim 11, wherein the air flow meter further comprises;
   a fixed orifice obstruction for producing a pressure differential of air flowing between a first point and a second point in said first air flow path;
   a first pressure transducer for measuring a first air pressure value at the first point, and for producing and transmitting a first electronic signal corresponding to said first air pressure valve to said microprocessor; and,
   a second pressure transducer for measuring a second air pressure valve at the second point, and for producing and transmitting a second electronic signal corresponding to said second air pressure valve to said microprocessor.

13. The apparatus of claim 11, wherein the flow control valve further comprises:
   a spring biased needle, said spring biased needle being slidable through a lateral opening in said first air flow path for controlling the flow rate of air therethrough; and,
   a diaphragm for moving the needle between open and closed positions.

14. The apparatus of claim 13, further comprising:
   a voltage to pneumatic converter, said voltage to pneumatic converter being electrically connected to said microprocessor and pneumatically connected to said air flow control valve;
   wherein an electronic signal received by the voltage to pneumatic converter from the microprocessor is converted into pneumatic signal transmitted to the flow control valve; and,
   wherein the pneumatic signal received by the flow control valve from the voltage to pneumatic converter produces a deflection of said diaphragm to thereby move the needle.

15. The apparatus of claim 14, wherein the needle is biased by a spring force acting in one direction, and the pneumatic signal received by the flow control valve from the voltage to pneumatic converter produces a pressure force acting against said diaphragm in the opposite direction.

* * * * *